Nov. 12, 1929.          L. H. SPRINKLE          1,735,218
PROCESS OF LINING WITH FOIL ANCHORAGE OPENINGS
IN ARTIFICIAL TEETH AND FACINGS
Filed March 27, 1928
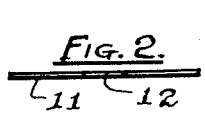
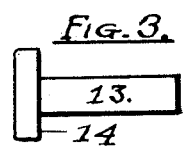
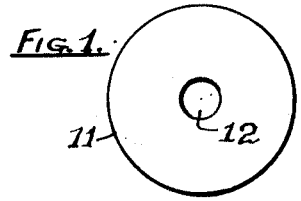
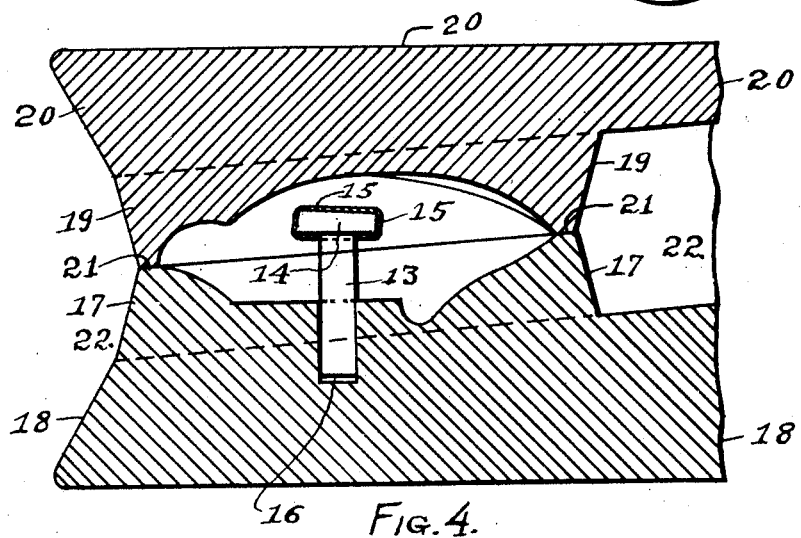
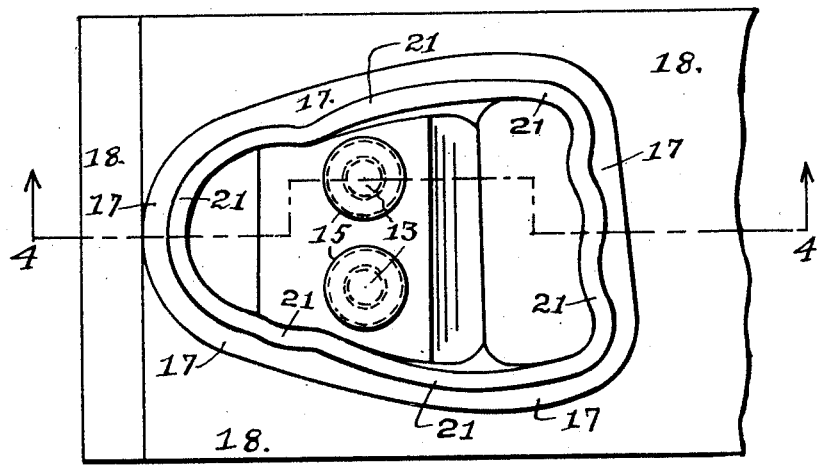
Inventor:
Lake H. Sprinkle
By his Attorney
Israel Benjamins.

Patented Nov. 12, 1929

1,735,218

UNITED STATES PATENT OFFICE

LAKE H. SPRINKLE, OF BROOKLYN, NEW YORK

PROCESS OF LINING WITH FOIL ANCHORAGE OPENINGS IN ARTIFICIAL TEETH AND FACINGS

Application filed March 27, 1928. Serial No. 265,155.

My invention relates to improvements in a process of lining anchorage openings in artificial teeth and facings, preliminary to having suitable pins anchored therein, and connecting said teeth or facings to a plate or backing, and it consists in the novel features, which are hereinafter described.

One of the objects of my invention is—to keep molding material of a tooth or facing from getting into the anchorage space or undercut of said tooth or facing during the operation of inserting the lining, thereby securing a perfect anchorage.

Another object of my invention is—to prevent the anchorage lining of said undercut from being lost.

A further object of my invention is—to facilitate the production of anchorages in artificial teeth and facings.

Another object of my invention is—to make said anchorages more perfect.

A further object of my invention is—to enable thinner foil to be used as an anchorage lining, and to prevent the distortion of said foil during the operation of inserting said lining into place in a tooth or facing.

Another object of my invention is—to increase the strength of the anchoring pin at the root of the anchorage at the undercut of a tooth or facing, without undue expense.

A further object of my invention is—to assist in producing an artificial tooth or facing, which is simple, durable and inexpensive.

Other objects and advantages will hereinafter appear.

I attain these objects by the process, which is hereinafter described and illustrated in the accompanying drawings, or by any mechanical equivalent or obvious modification of the same.

In the drawings Fig. 1 is a plan view of a disc of foil, which is hereinafter described, and which is employed in my process.

Fig. 2 is a side elevation or edge view of said disc.

Fig. 3 is a side elevation of a pin, which is hereinafter described, and which is also used in my process of lining anchorages of artificial teeth and facings.

Fig. 4 is a fragmentary vertical section on the line 4—4 of Fig. 5, showing a mold for producing artificial teeth and facings and showing said pin in elevation.

Fig. 5 is a fragmentary plan view of the lower or lingual part of a mold used for producing artificial teeth and facings, and showing a pair of said pins.

Like numerals refer to like parts throughout the several views.

11 designates a disc of foil or other non-combustible material, which may be platinum or any other metal or alloy, which is capable of withstanding the heat of a dental furnace, and has therein an opening 12.

13 designates a pin, which may be made of wood, fibre or any other combustible material, and has thereon a head 14, the latter may be omitted in cheaper teeth or facings, if desired.

Said disc 11 is passed with its opening 12 over the shank of said pin 12, until said disc reaches the inner or under side of said head 14.

By means of suitable dies, which are not shown in the drawings, the rim of said disc 11 may be turned over said head 14 and pressed thereonto until it forms a cap 15 which is shown in Fig. 4 as enclosing said head 14; either the entire top or part of the top of said head 14 may be left uncovered by said foil, if desired.

The foil may also be applied in any other way than as hereinbefore described.

One or more pins 13, with said caps 15 thereon, may then be inserted each with one end thereof into an opening 16, which is shown as provided in the lower or lingual part 17 of a mold, which has thereon a base 18, into which said opening 16 extends.

The pins may also be positioned otherwise, if desired.

The upper part 19 of said mold, which has thereon a crown 20, may then be placed over said lower part 17, after the space between said two parts is packed with molding porcelain, which is also packed around said pins 13 and said caps 15 thereon.

The two parts of the mold are then pressed together until their cutting edges 21 meet, after forcing the superfluous material into the waste opening 22, thereby forming a tooth or facing.

The molds 17—20 are usually made in gangs for forming therein a number of teeth or facings in one operation; but only a fragment of the mold, for forming only one tooth or facing, is shown in the drawings.

After the tooth or facing is formed, it is removed from said mold 17—20 and placed in a furnace to be baked; the pins 13 with their heads 14 are then consumed in the furnace, leaving the caps 15 as linings in the undercuts which are formed in said tooth or facing at the inner ends of openings which are formed and left by said pins 13.

Said caps 15 may also be left as linings in said teeth or facings by pins 13 otherwise than by burning out said pins.

Said lined undercuts may be employed for anchoring therein gold pins or projections, which may be employed for connecting said tooth or facing to a plate or backing; said gold pins or projections may be flowed in or soldered into position in said undercuts.

Instead of coating only the head 14 of said pin 13 with foil, the shank thereof may also be coated, if desired; the disc of foil 11 may then have no opening 12 therein, and it may be applied first to the outer end of said head 14 and then turned over by means of suitable dies and pressed into contact with the shank of said pin 13, if desired.

Instead of a cylindrical pin 13 any other post or projection may be employed, and the term "pin", as used by me in the claims hereinafter is meant to include all such modifications.

It is evident that by the above process all the objects, which are hereinbefore described, are attained.

Many changes may be made in the details of my process of lining anchorage openings in artificial teeth or facings, without departing from the main scope of my invention, and part of my invention may be used without other parts.

I do not, therefore, restrict myself to the details as hereinbefore described and illustrated; but I intend to include also all mechanical equivalents and obvious modifications of the same within the scope of my invention.

I claim as my invention and desire to secure by Letters Patent:

1. A process of lining with foil anchorage openings in artificial teeth and facings consisting in providing discs of foil of noncombustible material and pins of combustible material having thereon each a head and a shank, said head being larger than the shank, then pressing by means of a suitable die said disc of noncombustible foil on to one side of said head and then turning the rim of said disc over said head and pressing said rim thereunto until it forms a cap enclosing said head, then introducing said pin with said cap of foil on its head into the material of an artificial tooth or facing, when the same is being molded, and then having said pin with the head thereof consumed in a furnace, leaving said foil as a lining in the undercut of the opening formed in the body of said tooth or facing by said head.

2. A process of lining with foil anchorage openings in artificial teeth or facings consisting in providing discs of foil of noncombustible material, having therein each an opening, and pins of combustible material, having thereon each a head, then passing said discs each with its opening over the shank of one of said pins until said disc reaches the underside of said head, then turning the rim of said disc over said head by means of a suitable die, and pressing said rim thereunto until it forms a cap enclosing said head, then placing said pin with said cap on its head into the material of an artificial tooth or facing when the same is being molded, and then having said pin with the head thereof consumed in a furnace, leaving said noncombustible foil cap as a lining in the undercut of the opening formed in the body of said tooth or facing by said head.

LAKE H. SPRINKLE.